United States Patent Office 3,429,819
Patented Feb. 25, 1969

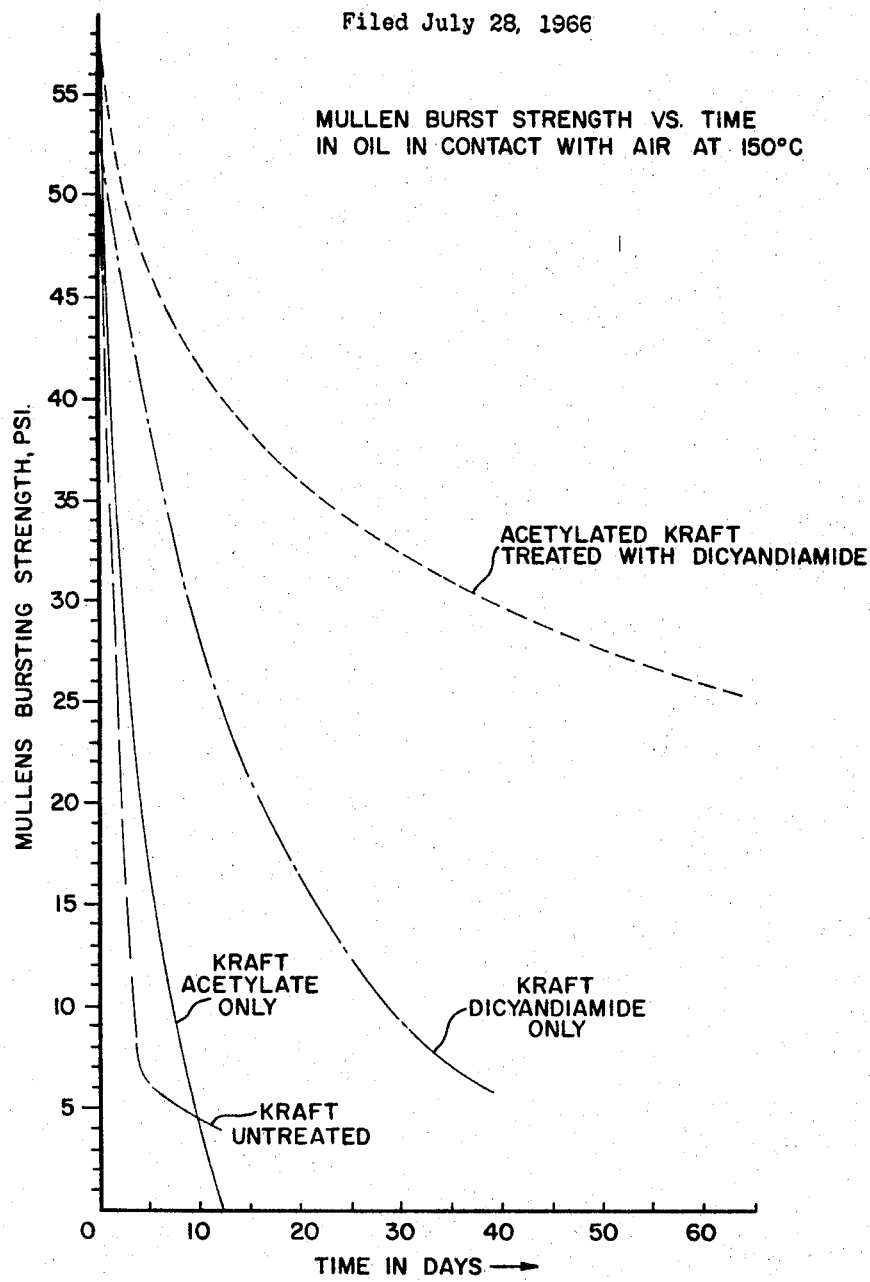

3,429,819
THERMALLY STABLE CELLULOSIC INSULATION MATERIAL
Paul A. Tierney, Ballwin, Mo., assignor to Westinghouse Electric Corporation, Pittsburgh, Pa., a corporation of Pennsylvania
Filed July 28, 1966, Ser. No. 568,668
U.S. Cl. 252—63.7    4 Claims
Int. Cl. H01b 3/48; H01g 1/00

ABSTRACT OF THE DISCLOSURE

A cellulosic electrical insulation material having improved thermal stability when used at elevated temperatures, the material being composed of partially acetylated cellulose with from 1 to 2 hydroxyl groups per glucopyranose molecule, and having admixed therein from 0.1 to 10% by weight of a non-acidic nitrogenous compound such as dicyandiamide, melamine, urea, and alkyl substituted ureas.

---

This invention relates to thermally stable cellulosic insulation material for use in electrical equipment that operate at higher temperatures.

Cellulose such as paper is frequently used by electrical equipment manufacturers as electrical insulation and as structural support in the form of paper pressboard. Paper has the advantage over other material in that it is relatively inexpensive. Its chief disadvantage is that it is inferior in thermal stability to many other insulating materials. In order to make electrical equipment that can operate at higher temperatures it is necessary to use expensive inorganic materials such as mica and glass, or to employ synthetic plastics. Therefore, it is desirable to modify the cheaper cellulosic insulation in such a way as to upgrade its thermal stability.

One way to improve the thermal stability of cellulose is to change the basic structure of cellulose (glucopyranose) into a more stable material by chemical reaction. There are many known examples of chemical derivatives of cellulose including cyanoethylated cellulose and carboxymethylated cellulose. When these reactions are carried out on a piece of cellulose such as paper or on paper pulp and if not allowed to proceed too far, a chemically modified paper is obtained. In some cases, the thermal stability of the modified paper is materially greater than that of the paper from which it was made. In other cases, such as upon acetylation of cellulose, the stability is lowered. Another way to improve the thermal stability of cellulose which has been successful is the addition of chemical substances to the paper which in some way prevent or reduce the rate of thermal degradation of the paper. An example of the second procedure is disclosed in patent No. 3,102,159.

According to the present invention it has been found that cellulosic type materials may be provided with improved thermal stability by, first, acetylating to a given degree a preformed body of cellulosic material and, secondly, treating the acetylated body of material with a nitrogenous compound or derivative selected from at least one of the group including dicyandiamide, melamine, urea, and alkyl substituted ureas. It has been found that dicyandiamide in acetylated paper increases the thermal stability much more effectively than it increases the thermal stability of plain kraft paper. In the absence of dicyandiamide the acetylated paper is less stable than kraft paper. However, when both papers are treated with dicyandiamide the difference in improvement in stability is such that the acetylated paper becomes three times more stable than the kraft paper. This is especially surprising since acetylation of a piece of kraft paper which had been previously treated with dicyandiamide gave no improvement over kraft paper.

Accordingly, it is an object of this invention to provide a thermally stable cellulose material for use in electrical equipment that operates at higher temperatures.

It is another object of this invention to provide a thermally stable cellulosic material which has been acetylated and then treated with selected nitrogenous compounds, having greater dimensional stability, strength, and rot resistance.

It is another object of this invention to provide a method for making a thermally stable cellulosic material that is acetylated and then treated with selected nitrogenous compound.

Finally, it is an object of this invention to satisfy the foregoing objects in a simple and expedient manner.

For a better understanding of the invention reference is made to the drawing in which is a chart showing the percent retention of Mullen bursting strength values versus time in oil in contact with air at 150° for untreated and treated kraft paper.

The method of this invention by which a cellulosic material such as cotton, linen, wood, or pressboard may be imbued with greater thermal stability involves the steps of first acetylating the material and then treating the acetylated cellulosic material with a compound or derivative selected from at least one nitrogenous compound of the group consisting of dicyandiamide, melamine, urea, and alkyl substituted ureas to apply from 0.1 to 10% of the weight of the acetylated cellulose. The reverse order of treatment does not produce the desired results.

The acetylated paper used in this invention is made by acetylating the —OH groups in the glucopyranose units not involved in interfiber bonding. The result is a thermally stable paper which still has high tensile and Mullen Burst values. In order to obtain a high thermal stability in oil, however, it is necessary to treat the partially acetylated paper with dicyandiamide. Such a treatment results in a material which is three times more stable in oil than any previously known cellulosic material. Another important advantage of this material is the low moisture content, 1.5% by weight versus 8% by weight for kraft paper. Because of the lower moisture content, greater dimensional stability is obtained.

Although acetylated paper is an essential part of this invention, the method of acetylation is immaterial. For example the results obtained are just as satisfactory within a wide range of concentrations of acetic acid and acetic anhydride in the acetylating bath. The acetylation step is accomplished by immersing the paper in a solution of acetic anhydride, acetic acid, and perchloric acid. Sulfuric acid may replace all or a part of the perchloric acid. The degree of acetylation is that sufficient to provide for about 1 to 2 acetyl groups per glucopyranose unit. Excessive or complete acetylation of the paper leads to disintegration and to eventual dissolution.

The acetylated material is thereafter treated with a nitrogenous compound having at least one group having the radical structure:

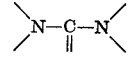

in the molecule.

Examples are melamine, dicyandiamide, urea, and dimethyl urea.

The treatment of the acetylated paper is performed by immersing the acetylated paper in a solution of, for example, dicyandiamide after drying the acetylated paper. The solution is prepared by dissolving dicyandiamide in a solvent of dimethylformamide, dimethylacetamide, methanol, or even hot water. An excess of dicyandiamide should be used.

The following example is illustrative of the present invention:

EXAMPLE

Pieces of kraft paper, 4" x 4" x 0.005" were placed in a 1000 ml. beaker containing 680 gms. of acetic anhydride, 120 gms. (15% by weight) of acetic acid and 16 drops (ca. 2 ml.) of perchloric acid. After standing in this acetylating bath for 30 minutes at room temperature, the paper was placed in cold tap water and rinsed thoroughly. After rinsing, the paper was dipped in a water solution (concentration of 10 gm./100 ml.) of dicyandiamide. The paper picked up 5% by weight of dicyandiamide. The paper was allowed to dry in the air and then was finally ironed to eliminate wrinkles.

The paper is then aged according to a standard procedure by immersing the paper in an oil bath at a temperature of approximately 150° C. At progressively longer intervals of time the paper is removed and tested in a Mullen Burst Testing Machine for determining its bursting strength. Similarly, sheets of untreated kraft paper as well as kraft paper which has been treated with 5% dicyandiamide alone, and with acetylated kraft paper with no dicyandiamide added were aged and tested in the same manner. The results of these tests are shown in the attached table.

TABLE.—MULLEN BURSTING STRENGTH FOR TREATED AND UNTREATED KRAFT PAPER

| Aging time, days | Mullen bursting strengths, p.s.i. | | | |
|---|---|---|---|---|
| | Kraft untreated | Kraft dicyandiamide treated | Acetylated kraft untreated | Acetylated kraft dicyandiamide treated |
| 0 | 51.3 | 53.1 | 57.6 | 57.6 |
| 2 | | 45.4 | | |
| 3 | 13.0 | | 19.3 | 45.9 |
| 5 | 5.5 | | | |
| 7 | | | 10.6 | |
| 9 | | 29.8 | | 43.6 |
| 12 | 4.1 | 24.8 | 0 | 36.9 |
| 16 | | 22.6 | | 33.9 |
| 21 | | 16.4 | | 33.0 |
| 26 | | 11.9 | | 34.0 |
| 32 | | 8.7 | | 34.0 |
| 39 | | 5.9 | | |
| 46 | | | | 26.0 |
| 55 | | | | 31.0 |
| 61 | | | | 15.0 |

Each value in the above table is an average of tests on about eight samples of paper.

The aging tests were carried out in highly refined transformer oil in open beakers at 150° C.

To facilitate the comparison of the significance of the values in the table, reference is made to the drawing in which the respective values are plotted for the several papers, namely, the Mullen bursting strength in p.s.i. versus time in days.

Similar tests were run with satisfactory results for paper treated with melamine and urea instead of dicyandiamide. Equal parts of melamine and dicyandiamide give equally good results.

Acetylated paper itself has a higher thermal stability in air than does kraft paper (or even kraft paper treated with dicyandiamide). Upon actylation, the rate of thermal degradation is reduced so that paper made from an acetylated pulp also has higher thermal stability in air, but because of the replacement of —OH groups by acetyl groups fewer —OH groups are available for interfiber bonding. This results in a paper with low tensile and Mullen Burst values.

This acetylated and treated cellulosic material should find application in the electrical equipment industry in all places where cellulosic materials are now being used and where higher thermal stability is needed. In addition, the material may find application in other places where cellulosic material is used.

Accordingly, the thermally stable cellulosic material such as dicyandiamide treated kraft paper is three times more stable in air than any known cellulosic material.

It will be understood that the above specification and drawing are merely exemplary and not in limitation of the invention.

What is claimed is:

1. A cellulose electrical insulation material for use at elevated temperatures having thermal stability, comprising a cellulosic sheet composed of partially acetylated cellulose to provide from 1 to 2 hydroxyl groups per glucopyranose molecule, having intimately admixed in the fibers of said sheet from 0.1 to 10% by weight of a non-acidic compound selected from at least one nitrogenous compound consisting of dicyandiamide, melamine, urea, and alkyl substituted ureas.

2. The cellulosic material of claim 1 in which the nitrogenous compound is dicyandiamide.

3. A method for preparing a thermally stable cellulosic material including the steps of acetylating kraft paper by applying a solution of acetic anhydride to provide from 1 to 2 hydroxyl groups per glucopyranose molecule, and thereafter treating the paper with a solution of a non-acidic compound selected from at least one compound from a group consisting of dicyandiamide, melamine, urea, and alkyl substituted ureas to introduce from 0.1% to 10% by weight of such compound in the paper.

4. The method of claim 3 in which the non-acidic compound is dicyandiamide.

References Cited

UNITED STATES PATENTS

| | | | |
|---|---|---|---|
| 2,000,428 | 5/1935 | Walker | 8—121 XR |
| 2,092,477 | 9/1937 | Scott et al. | 8—121 XR |
| 2,848,341 | 8/1958 | Gearhart et al. | 260—230 |

LEON D. ROSDOL, *Primary Examiner.*

J. D. WELSH, *Assistant Examiner.*

U.S. Cl. X.R.

8—116.2, 121; 117—144; 317—258; 252—64; 260—230

UNITED STATES PATENT OFFICE
CERTIFICATE OF CORRECTION

Patent No. 3,429,819                    February 25, 1969

Paul A. Tierney

It is certified that error appears in the above identified patent and that said Letters Patent are hereby corrected as shown below:

Column 4, line 26, after "provide" insert -- for --; line 27, after "molecule" insert -- being acetylated --; line 36, after "provide" insert -- for acetylating --.

Signed and sealed this 21st day of April 1970.

(SEAL)
Attest:

Edward M. Fletcher, Jr.                WILLIAM E. SCHUYLER, JR.
Attesting Officer                           Commissioner of Patents